United States Patent [19]

Koa

[11] Patent Number: 5,067,772
[45] Date of Patent: Nov. 26, 1991

[54] FOAM SEAT WITH INSERT

[75] Inventor: Chi H. Koa, Jackson, Mich.

[73] Assignee: Michigan Seat Company, Jackson, Mich.

[21] Appl. No.: 501,003

[22] Filed: Mar. 29, 1990

[51] Int. Cl.$^5$ .............................................. A47C 7/02
[52] U.S. Cl. ................................... 297/452; 297/455; 297/459; 297/DIG. 6; 297/229; 297/DIG. 2
[58] Field of Search .................. 297/452, 455, DIG. 6, 297/457, 459, DIG. 2, 219, 229, DIG. 1; 24/306, 442; 248/205.2; 2/DIG. 6

[56] References Cited

U.S. PATENT DOCUMENTS

| | | | |
|---|---|---|---|
| 3,266,065 | 8/1966 | Bereday | 297/452 |
| 3,281,185 | 10/1966 | Albinson | 297/452 |
| 3,353,869 | 12/1965 | Getz et al. | 297/452 |
| 3,494,006 | 2/1970 | Brumlik | 24/306 |
| 3,521,929 | 11/1967 | Pearson | 297/454 |
| 3,603,639 | 9/1971 | Wilson | 297/DIG. 6 |
| 3,656,807 | 4/1972 | Arida et al. | 297/DIG. 2 |
| 3,669,498 | 6/1972 | Meyers et al. | 297/455 |
| 3,833,454 | 9/1974 | Ambrose | 297/DIG. 2 |
| 4,065,181 | 12/1977 | Gunlock et al. | 297/452 |
| 4,065,182 | 12/1977 | Braniff et al. | 297/452 |
| 4,079,994 | 3/1978 | Kehl | 297/455 |
| 4,368,917 | 1/1983 | Urai | 297/DIG. 2 |
| 4,502,731 | 3/1985 | Snider | 297/DIG. 2 |
| 4,544,205 | 10/1985 | Molnar | 297/455 |
| 4,563,380 | 1/1986 | Black et al. | 24/306 |
| 4,564,239 | 9/1986 | Akimoto | 297/452 |
| 4,568,124 | 2/1986 | Kanai | 297/DIG. 6 |
| 4,577,907 | 3/1986 | Talmon et al. | 297/DIG. 1 |
| 4,617,214 | 10/1986 | Billarant | 24/306 |
| 4,643,481 | 2/1987 | Saloff et al. | 297/458 |
| 4,647,109 | 3/1987 | Christophersen et al. | 297/DIG. 2 |
| 4,693,921 | 9/1987 | Billarant et al. | 24/306 |
| 4,710,414 | 12/1987 | Northrup et al. | 24/306 |
| 4,792,189 | 12/1988 | Shovar | 297/452 |
| 4,802,939 | 2/1989 | Billarant et al. | 24/306 |
| 4,834,458 | 5/1989 | Izumida et al. | 297/459 |
| 4,836,609 | 6/1989 | Hill | 297/452 |
| 4,881,997 | 11/1989 | Hatch | 24/306 |
| 4,892,356 | 1/1990 | Pittman et al. | 297/460 X |

FOREIGN PATENT DOCUMENTS 2240762 9/1962 Australia ........................... 297/452

Primary Examiner—Peter R. Brown
Assistant Examiner—Milton Nelson, Jr.
Attorney, Agent, or Firm—Beaman & Beaman

[57] ABSTRACT

A seat using a foam cushion removably mounted upon a pan, the pan and cushion both being molded of a synthetic plastic material. Releasable fasteners of the hook and loop type maintain the cushion upon the pan and one of the fastener elements is molded into the pan material while the other element is affixed to a cushion insert. The synthetic plastic pan may include integral spring elements providing additional resiliency to the cushion.

3 Claims, 2 Drawing Sheets

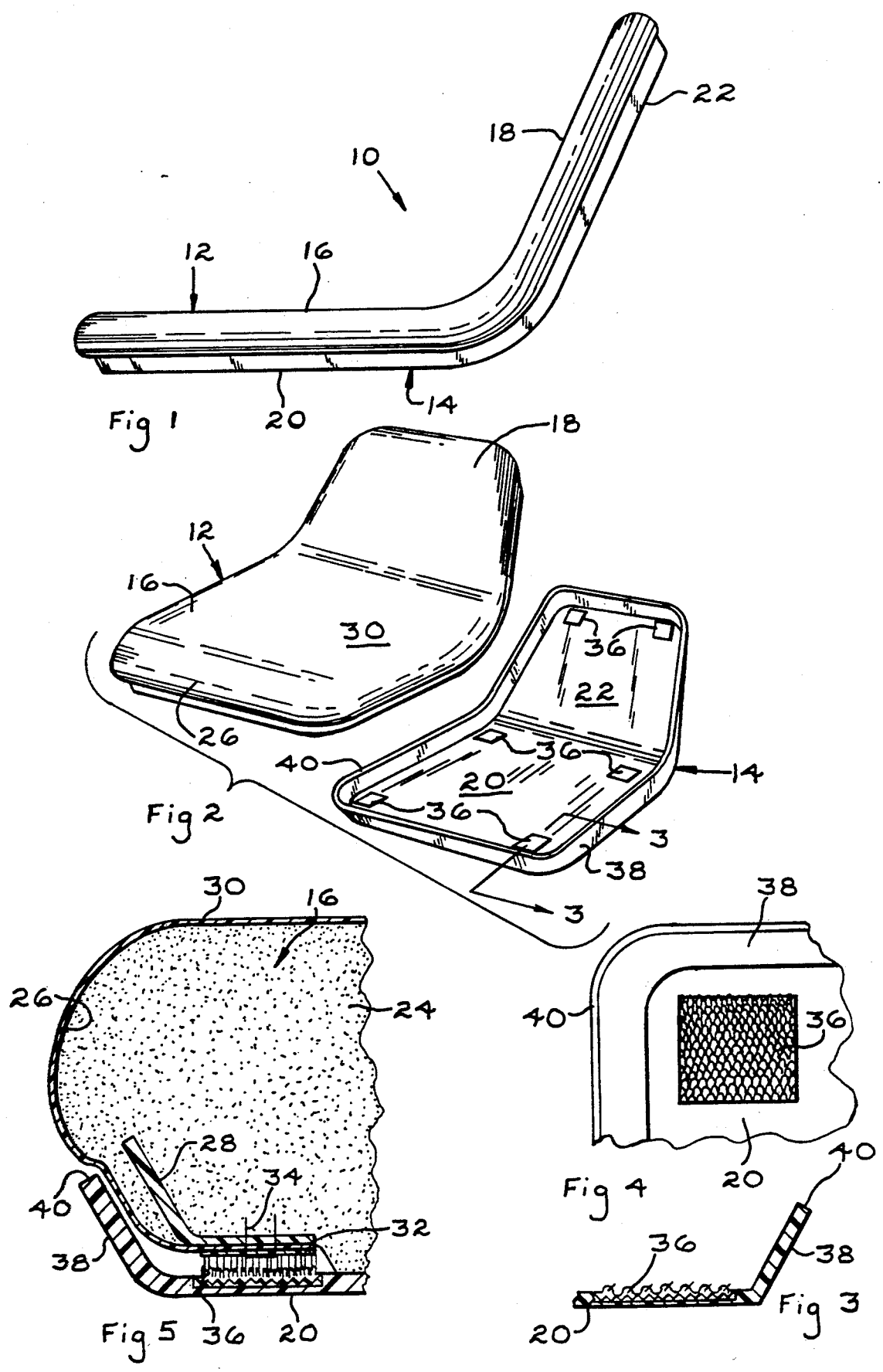

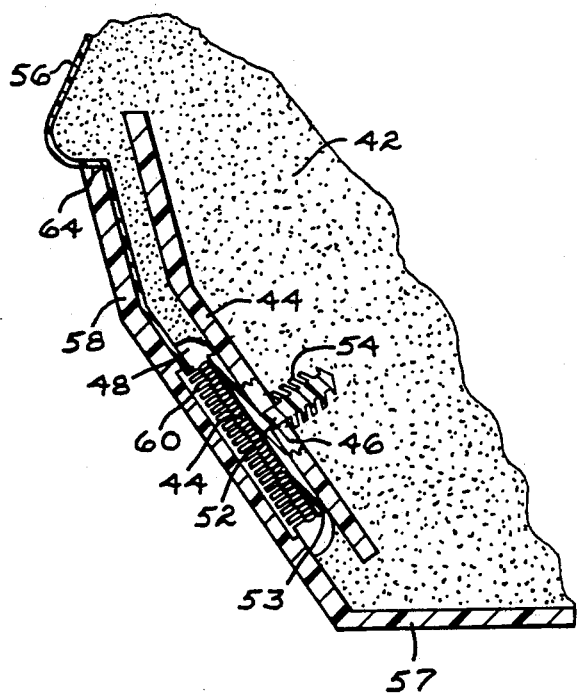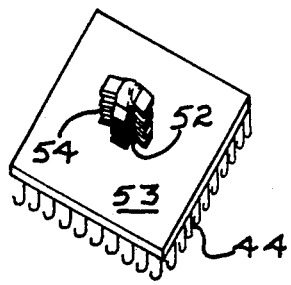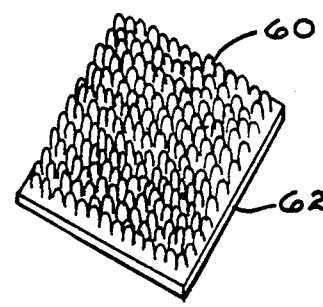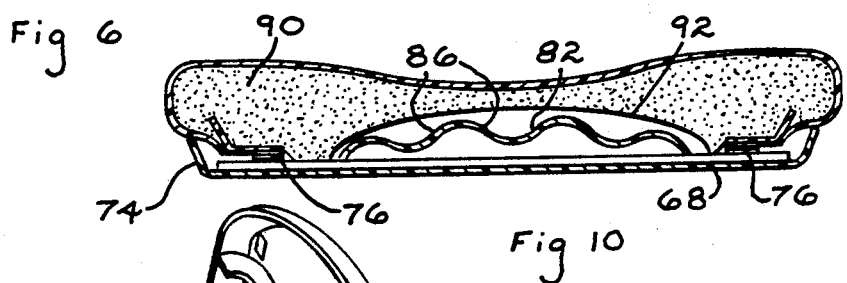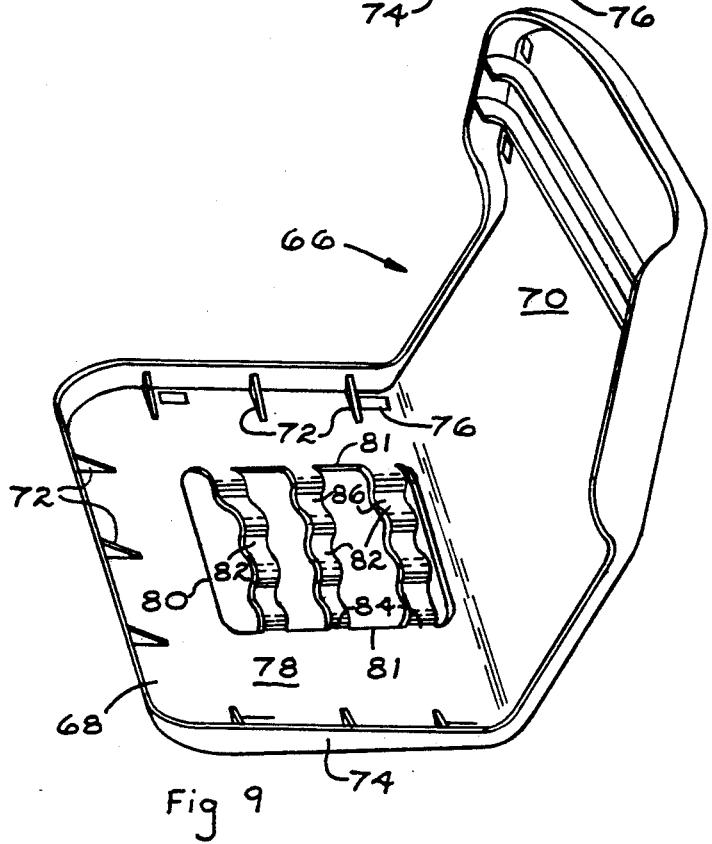

FOAM SEAT WITH INSERT

BACKGROUND OF THE INVENTION

Seats having synthetic foam cushions are widely employed in a variety of applications and as a foam cushion, in itself, has little structural strength it is common to use a support or pan to receive and support the cushion and provide the necessary resistance to cushion deformation as weight is applied to the cushion. Seats used with tractors, garden tractors, lawn mowers and industrial equipment commonly consist of a metal pan having a bottom portion, and often a back portion, which receives the foam cushion, the cushion usually being covered by vinyl sheeting or the like.

In most constructions, particularly with agriculturally related or industrial applications, the pan is formed of stamped sheet steel, and inserts are located within the cushion having nuts or other threaded type connectors wherein fasteners extend through the pan and attach the cushion thereon. Cushions may also be attached to the pan by welts or other binding structure which interconnects the peripheries of the pan and cushion, and it is known to use foam cushions in conjunction with synthetic plastic pans of a molded configuration. Typical examples of such constructions are shown in U.S. Pat. Nos. 3,281,185; 3,521,929; 4,792,189 and 4,834,458. In known seat constructions using foam cushions with synthetic plastic pans the cushions are not usually readily removable from the pans and replacement of the cushions is not easily accomplished.

In U.S. Pat. No. 4,836,609 a combination foam cushion and steel pan unit is disclosed wherein the cushion may be readily releasably removed from the pan, and this patent also discloses the use of hook and loop fastener elements for releasably mounting the cushion on the pan. However, the fastener elements are not molded into the pan and adherence of the fastener elements to the pan is a problem.

Seats utilizing foam cushions depend, to a large extent, upon the resiliency of the foam to provide cushioning and damping of vibrations. Spring members of various types have been used in combination with seats employing foam cushions, but such seats are relatively complex and of high cost. As shown in U.S. Pat. No. 4,353,869 a resilient suspension for foam cushions may be incorporated into a seat bottom of relatively limited vertical dimension, but such spring elements are separate from the basic seat support structure and require complex secondary operations and assembly with respect to the manufacture of the complete structure.

It is an object of the invention to provide a combination foam cushion and pan construction wherein both the cushion and pan are formed of a synthetic plastic material and quick release fasteners are interposed between the cushion and pan to permit ready replacement of the cushion.

Another object of the invention is to provide a foam cushion and pan seat assembly which does not require a welt or clinch element between the pan and seat and wherein an attractive transition between the pan periphery and the cushion is provided which requires no secondary assembly procedures.

A further object of the invention is to provide a foam cushion and pan assembly wherein both cushion and pan are formed of a synthetic plastic material and releasable fastener elements are molded into the pan and readily affixed to cushion structure minimizing assembly time.

Yet an additional object of the invention is to provide seat structure utilizing a foam cushion and a synthetic plastic cushion supporting pan wherein spring elements are homogeneously defined within the pan of the pan material, such spring elements aiding in the support of weight imposed upon the seat and reducing the transmission of vibrations from the pan to the cushion.

In the practice of the invention the seat pan includes bottom and back portions angularly related to each other, preferably homogeneously formed of a molded synthetic plastic material. The foam cushion may also include bottom and back portions releasably mounted upon and superimposed over the corresponding pan portions. The cushion portions include a rigid synthetic plastic insert remotely located from the cushion weight supporting surface as to be located adjacent the pan portions, and releasable fastener structure mounts the cushion upon the pan.

Preferably, the fastener is of the hook and loop element type available under the trademark VELCRO and one of the elements is molded into the synthetic plastic pan, while the other element is inserted into a hole formed in the cushion insert. Cushion replacement is readily achieved by the consumer by merely pulling the cushion away from the pan to release the fastener elements.

The pan peripheral configuration is such as to eliminate the need for a welt or clinch at the pan periphery to associate with the cushion, and the construction of the seat provides a clean unitary appearance.

The pan includes a periphery flange region generally disposed in the direction of the cushion which encompasses the region of the cushion disposed toward the pan and the size of the cushion is slightly greater than the pan peripheral flange dimension such that the seat periphery extends over the pan edge producing a quality appearance and eliminating pan edge shielding structure.

The use of a plurality of loop end hook element fasteners permits the cushion to be accurately and quickly assembled to the pan at the factory, and cushion replacement is readily achieved by the user without special skills or tools as the cushion can be pulled from the pan and a new cushion installed merely by locating the cushion relative to the pan and applying a compressive force to the cushion.

The central region of the pan bottom portion may be provided with a plurality of homogeneous spring members in the form of a plurality of resilient bands or strips homogeneously defined of the synthetic plastic material of the pan bottom portion which extend upwardly in a bowed convex configuration from the general plane of the pan bottom portion. Such spring members are preferably formed with a sinuous configuration and are received within a recess defined on the inner surface of the cushion bottom portion wherein the spring members are capable of deflection under the weight of the seat occupant to augment the damping and suspension action of the cushion bottom portion without adding significant cost to the assembled seat apparatus. The utilization of such homogeneous spring members requires no second operations to the manufacturing process and provides the seat with improved cushioning and vibration damping characteristics at minimal cost.

BRIEF DESCRIPTION OF THE DRAWINGS

The aforementioned objects and advantages of the invention will be appreciated from the following description and accompanying drawings wherein:

FIG. 1 is a side elevational view of a seat assembly constructed in accord with the invention, FIG. 2 is an exploded view of a seat incorporating inventive concepts of the invention, the cushion and pan being shown in a preassembled relationship, FIG. 3 is an enlarged, elevational detail sectional view of the pan and a fastener element as taken along section 3—3 of FIG. 2, FIG. 4 is an enlarged detail plan view of a fastening element molded into the pan, FIG. 5 is an enlarged, detail, elevational, sectional view illustrating the cushion and pan in assembled relationship as taken through a fastener, FIG. 6 is an enlarged, detail elevational sectional view of another version of the cushion and pan assembly as assembled, FIG. 7 is a perspective of the top of the fastener hook element attached to the cushion insert, FIG. 8 is a perspective view of the fastener loop element molded into the pan, FIG. 9 is a perspective view of a pan embodiment having homogeneous spring members defined on the pan seat portion, and FIG. 10 is an elevational, transverse sectional view of a cushion as mounted on the pan shown in FIG. 9.

DESCRIPTION OF THE PREFERRED EMBODIMENTS

With reference to FIG. 1, a typical seat assembly 10 is illustrated which includes a foam cushion 12 supported upon a pan 14. The pan 14 is mounted upon the support structure for the seat assembly, not shown, and the pan may be mounted upon suspension brackets, directly upon a tractor or industrial vehicle frame, or mounted upon any support apparatus with which a seat may be employed.

The cushion 12 consists of a bottom portion 16 and a cushion back portion 18. Each of these portions includes an inner surface disposed toward the pan. The pan 14 is molded of a synthetic plastic material and includes a bottom portion 20 and a back portion 22 angularly disposed to the general plane of the pan bottom portion at an angle similar to that of the seat portions. The cushion 12 is formed by an elastomeric synthetic plastic foam 24, FIG. 5, of the type well known in the seating art. The cushion bottom portion 16 includes a rounded edge 26, and adjacent its inner surface the cushion includes a synthetic plastic insert 28 which is molded into the cushion foam during foam formation. The insert 28 will be of a general form conforming to the cushion bottom and back portions 16 and 18 disposed adjacent the cushion portions inner surface, and the insert provides the cushion with a rigidity and strength which would not, otherwise, be present, and also, the insert provides a means for attaching the cushion to the pan. Inserts such as shown at 28 are well known in the foam cushion art, reference being made to U.S. Pat. No. 4,836,609, for instance.

The cushion is encompassed within a vinyl fiber or sheet cover 30 extending over the cushion foam surface, and the cover 30 extends around the edge 26 for attachment to the insert 28 by staples the like as will be appreciated from FIG. 5.

A fastener element 32 is stapled at 34 to the insert 28, over the cover 30 and the element 32 comprises a patch of hook material of the type of known hook and loop fastener sold under the trademark VELCRO. In the embodiment disclosed in FIGS. 1-5 six fastener elements 32 are attached to the cushion 12 of the seat structure.

The pan portions 18 and 20 are provided with a loop type fastener element 36 located so as to matingly cooperate with the cushion elements 32. The elements 36 are located on the pan 12 as shown in FIG. 2, and the elements 36 are molded directly into the material of the pan portions so as to tightly bond to the pan and eliminate the need for any secondary operations after pan molding. The pan is provided with a flange 38 defining its peripheral region and the flange 38 extends in the general direction of the cushion 12. The dimension of the flange 38 is slightly less than the overall circumferential dimension of the cushion whereby the pan edge 40 will be located "under" the rounded cushion edge 26 throughout the cushion periphery, and as the pan edge 40 will be engaging the vinyl cover of the cushion, and the vinyl will be covering the edge 40 the need for other pan edge decorative or protective welts or clinches is eliminated.

In a seat assembly 10 as described with respect to FIGS. 1-5 the fact that the elements 36 are molded into the material of the pan 14 eliminates the need for secondary pan operations, and after the elements 32 have been stapled to the cushion insert 28, such stapling also aiding in pulling the cover 30 tightly over the cushion, the placing of the cushion portions 16 and 18 upon the pan portions 20 and 22, respectively, locates opposing elements 32 and 36 and merely by placing the cushion 12 within the pan flange 38 and pressing the cushion in the regions of the fasteners the cushion will be firmly retained on the pan 14, and yet may be removed from the pan for replacement purposes by a firm pulling force on the cushion.

In FIGS. 6-8 a slightly modified version of the cushion and pan portions of a seat assembly are illustrated. As shown in FIG. 6, the foam cushion 42 includes a synthetic plastic insert 44 having holes 46 defined therein. The cushion is recessed at 48 whereby the holes 46 will be exposed and a hook fastener element 50 may be located within the recess 48. The fastener element 50 includes an elongated stud 52 extending from the element backing 53, and the stud 52 is formed homogeneously of the synthetic plastic material of the backing 53 and includes a plurality of barbs 54 whereby, upon insertion of the stud 52 through the insert hole 46 the barbs 54 will pass through the hole and prevent the stud from being withdrawn therefrom maintaining the fastener element 50 firmly locked to the insert 44.

The cushion 42 is enclosed within the vinyl cover 56.

The pan 57 includes the flange 58 and the fastener element 60 is of the loop type and is molded into the flange 58. The fastener loop element 60 includes the backing ledge 62 formed of a synthetic plastic material and the compatibility between the ledge 62 and the synthetic plastic material of the molded pan 57 produces an effective bonding between the pan and the fastener element.

The pan edge 64 will engage the vinyl cover 56 as shown in FIG. 6 and as the dimensions of the cushion cause the covering cushion to overlap the pan edge 64 the pan edge is hidden from view providing an attractive transition between the cushion and the pan eliminating the need for other structure being mounted upon the pan edge.

The mode of mounting the fastener element 50 to the cushion insert 44 minimizes the time of assembly of the fastener elements 50 to the cushion 42 and as the fastener elements 60 are molded into the pan 57 secondary operations with respect to the pan are eliminated as in the case of the previously described pan embodiment.

In FIGS. 9 and 10 a variation in the pan construction is illustrated, and it is to be appreciated that in the embodiment of FIGS. 9 and 10 the previously described concepts may be utilized with respect to the fastener features.

The pan 66 consists of a bottom portion 68 and a back portion 70 integral with the bottom portion. The portions 68 and 70 are molded of a synthetic plastic material to the configuration which will be readily appreciated from FIG. 9. Reinforcing gussets 72 are employed between the lowermost portion of the bottom portion 68 and the pan peripherial flange 74, the gussets being homogeneously defined of the pan material and formed during molding.

The bottom portion 68 includes a substantially planar central region 78 having an opening 80 defined therein. The opening 80 includes opposed edges 81, and a plurality of spring members 82 extend between the edges 81 over the opening 80. In FIG. 9 three spring members 82 are disclosed, and the spring ends 84 are homogeneously associated with the opening edges 81 as the spring members 82 are homogeneously defined of the material of the pan central region 78.

The spring members 82 are of a bowed convex configuration extending above the general plane of the central region 78, and each of the spring members 82 has a plurality of sine waves 86 defined therein which aid in the resiliency and deflective characteristics of the spring members. The foam cushion 90 located within the pan bottom portion 68, FIG. 10, includes a recess 92 which accomodates the spring members 82, and the cushion 90 may be constructed in the manner described above with respect to the use of fastener elements such as shown in FIGS. 6-8. The application of weight to the cushion 90 will compress the cushion recess into engagement with the spring members, and the resilient characteristics of the spring members 82 permits the spring members to deflect downwardly toward the general plane of the pan bottom portion central region 78 and the sine wave configuration of the spring members, and the homogeneous construction of the spring members from the pan material, permits the spring members to dampen the transfer of vibrations from the pan to the cushion while providing a comfortable and resilient support of the seat occupant. As the spring members 82 are formed during the molding of the pan 66 secondary operations with respect to the formation of the spring members are eliminated.

It is appreciated that various modifications to the inventive concepts may be apparent to those skilled in the art without departing from the spirit and scope of the invention.

I claim:

1. A molded seat comprising, in combination, a pan formed of a molded synthetic plastic material, having a bottom portion and an integral back portion, said portions each including an inner surface, resilient foam bottom and back cushion portions mounted upon said pan bottom and back portions, respectively, said cushion portions each including an inner surface in opposed relationship to the associated pan portion inner surface, a plurality of fasteners interposed between said associated pan and cushion portions, each of said fasteners including a first element integrally molded into a pan portion and the material thereof and extending from the associated pan portion inner surface and a second element affixed to a cushion portion and extending from the associated cushion portion inner surface, one of said fasteners' elements including a plurality of loops and the other associated element including a plurality of deformable hooks releasably interconnecting with said loops whereby said fasteners releasably secure said cushion portions upon the associated pan portions, a substantially rigid cushion insert within said cushion portions, said inserts having a plurality of holes defined therein, said second fastener elements each including an elongated mounting stud having retaining means defined thereon, each stud being received within an insert hole to affix said second elements to said insert, said studs being formed of a synthetic plastic material and said retaining means defined on said studs comprising deformable barbs.

2. In a molded seat as in claim 1, said first element including a substantially rigid base, said base being molded into the material of the associated pan portion.

3. A foam seat assembly including a seat pan molded of a synthetic plastic material having a bottom panel having a central region having a general plane, an opening defined within the central region, a peripheral region including lateral sides, a foam cushion having an inner surface and a peripheral region superimposed over and supported upon the pan wherein the seat inner surface is disposed toward the pan central region, and fasteners maintaining the cushion upon the pan, the improvement comprising, at least three resilient spring members homogeneously formed on the central region of the pan bottom panel of the material of the pan extending upwardly from the general plane of the central region for weight bearing engagement with the cushion inner surface, each of said resilient spring members being of an elongated, linear, convex, upwardly bowed configuration having a length transverse to the pan lateral sides and extending across said opening, said spring members being spaced from one another by a gap of at least a width of one of said spring members and having end portions located in the pan central region general plane, said spring members bowed configuration including a plurality of sine waves having axes transverse to the length of the associated spring member, and a concave recess defined in the cushion inner surface, said spring members engaging said cushion recess.

* * * * *